(12) United States Patent
Khattab et al.

(10) Patent No.: US 9,413,178 B2
(45) Date of Patent: Aug. 9, 2016

(54) CHARGING DEVICE AND METHOD OF DETECTING A CONNECTION TO GROUND

(75) Inventors: Mazen Mohamad Khattab, Louisville, KY (US); John Kenneth Hooker, Louisville, KY (US); Denis Alagic, Louisville, KY (US)

(73) Assignee: General Electric Company, Schenectady, NY (US)

( * ) Notice: Subject to any disclaimer, the term of this patent is extended or adjusted under 35 U.S.C. 154(b) by 404 days.

(21) Appl. No.: 13/294,409

(22) Filed: Nov. 11, 2011

(65) Prior Publication Data

US 2012/0091960 A1 Apr. 19, 2012

(51) Int. Cl.
*G01R 31/14* (2006.01)
*H02J 7/00* (2006.01)
*B60L 3/00* (2006.01)

(52) U.S. Cl.
CPC ............ *H02J 7/0029* (2013.01); *B60L 3/0069* (2013.01)

(58) Field of Classification Search
CPC ............................ B60L 3/0069; G01R 31/025
USPC ......................................................... 320/109
See application file for complete search history.

(56) References Cited

U.S. PATENT DOCUMENTS

| | | | |
|---|---|---|---|
| 3,987,425 A * | 10/1976 | Lawton | ........................ 340/530 |
| 4,347,540 A | 8/1982 | Gary et al. | |
| 4,368,500 A | 1/1983 | Conroy, Jr. et al. | |
| 4,370,692 A | 1/1983 | Wellman, Jr. et al. | |
| 4,379,317 A | 4/1983 | Conroy, Jr. et al. | |
| 4,414,601 A | 11/1983 | Conroy, Jr. | |
| 4,949,214 A | 8/1990 | Spencer | |
| 5,754,114 A * | 5/1998 | Gnadt | .................. H02H 11/001 340/649 |
| 6,804,094 B2 | 10/2004 | Kampmeyer | |
| 7,292,420 B2 | 11/2007 | Jones | |
| 7,639,461 B2 | 12/2009 | DiSalvo et al. | |
| 7,944,213 B2 | 5/2011 | Roscoe et al. | |
| 2005/0046395 A1 * | 3/2005 | Aoyama | ......................... 322/27 |
| 2009/0121672 A1 * | 5/2009 | Endou | ........................... 320/104 |
| 2010/0194354 A1 * | 8/2010 | Gotou | ..................... B60L 3/003 320/163 |
| 2012/0013298 A1 * | 1/2012 | Prosser et al. | ................ 320/109 |
| 2012/0086458 A1 * | 4/2012 | Wei | ........................... H02H 3/16 324/509 |

* cited by examiner

*Primary Examiner* — Richard Isla Rodas
*Assistant Examiner* — Johali Torres Ruiz
(74) *Attorney, Agent, or Firm* — General Electric Company

(57) ABSTRACT

A charging device includes a current control device configured to receive a first amount of current from a power source. The charging device also includes a ground detection module including a leakage circuit configured to direct a second amount of current to ground to generate a leakage voltage and a comparison circuit configured to detect a connection to ground of the charging device based on the leakage voltage generated. The charging device also includes a controller coupled to the ground detection module and to the current control device. The controller is configured to enable the first amount of current to be supplied to a power storage device of an electric vehicle when the connection to ground is detected.

16 Claims, 2 Drawing Sheets

CHARGING DEVICE AND METHOD OF DETECTING A CONNECTION TO GROUND

BACKGROUND OF THE INVENTION

The present application relates generally to charging devices and, more particularly, to a charging device and a method of detecting a connection to ground.

As electric vehicles and/or hybrid electric vehicles have gained popularity, an associated need to manage delivery of electrical energy to such vehicles has increased. In addition, a need to provide safe and efficient charging devices or stations has been created by the increased use of such vehicles.

At least some known charging stations include a power cable or other conductor that may be removably coupled to the electric vehicle. The charging stations receive electricity from an electric utility distribution network or another electricity source, and deliver electricity to the electric vehicle through the power cable.

Known charging stations include one or more connections to ground, such as one or more connections to a physical ground or to a conductor for returning current from components within the charging station. Such connections to ground may provide a path to dissipate undesired currents, for example. However, at least some known charging stations may not effectively and/or efficiently determine whether the ground connection is properly provided.

BRIEF DESCRIPTION OF THE INVENTION

In one embodiment, a charging device is provided that includes a current control device configured to receive a first amount of current from a power source. The charging device also includes a ground detection module including a leakage circuit configured to direct a second amount of current to ground to generate a leakage voltage and a comparison circuit configured to detect a connection to ground of the charging device based on the leakage voltage generated. The charging device also includes a controller coupled to the ground detection module and to the current control device. The controller is configured to enable the first amount of current to be supplied to a power storage device of an electric vehicle when the connection to ground is detected.

In another embodiment, a ground detection module is provided for use with a charging device. The ground detection module includes a ground detection circuit including a leakage circuit configured to direct a first amount of current to ground to generate a leakage voltage, and a comparison circuit configured to detect a connection to ground of the charging device based on the leakage voltage generated. The ground detection circuit also includes an output connector configured to enable a second amount of current to be supplied to a power storage device when the connection to ground is detected.

In yet another embodiment, a method of detecting a grounding state of a charging device is provided that includes receiving a first amount of current from a power source and directing a second amount of current to ground to generate a leakage voltage. The method also includes receiving a reference voltage, comparing the leakage voltage to the reference voltage, and detecting a connection to ground based on the comparison of the leakage voltage and the reference voltage.

DETAILED DESCRIPTION OF THE INVENTION

In some embodiments, the term "electric vehicle" refers generally to a vehicle that includes one or more electric motors. Energy used by electric vehicles may come from various sources, such as, but not limited to, an on-board rechargeable battery and/or an on-board fuel cell. In one embodiment, the electric vehicle is a hybrid electric vehicle, which captures and stores energy generated, for example, by braking. A hybrid electric vehicle uses energy stored in an electrical source, such as a battery, to continue operating when idling to conserve fuel. Some hybrid electric vehicles are capable of recharging the battery by plugging into a power receptacle, such as a power outlet. Accordingly, the term "electric vehicle" as used herein may refer to a hybrid electric vehicle or any other vehicle to which electrical energy may be delivered, for example, via the power grid.

Figure 1:
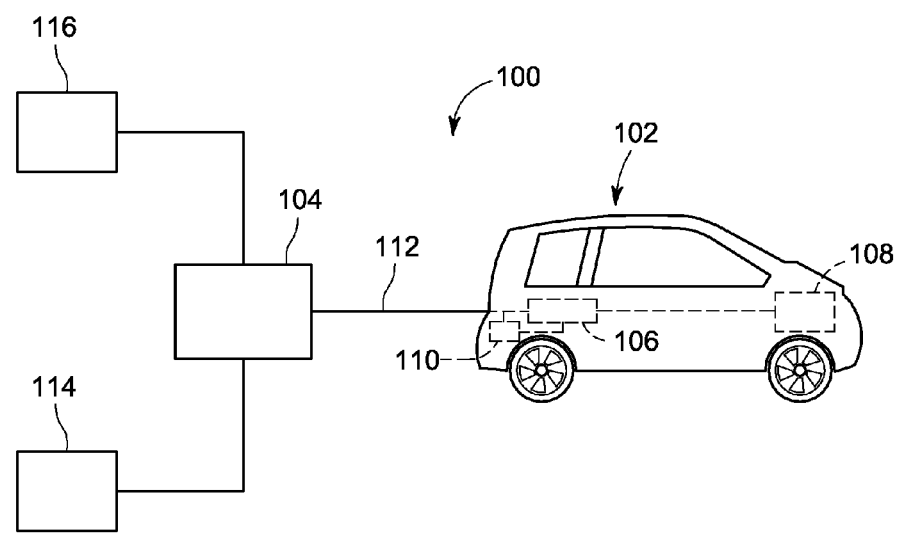
FIG. 1 is a block diagram of an exemplary system for charging an electric vehicle.

FIG. 1 illustrates an exemplary system 100 for use in charging, or providing electricity to, an electric vehicle 102. In an exemplary embodiment, system 100 includes a charging device 104 coupled to electric vehicle 102. In an embodiment, electric vehicle 102 includes at least one power storage device 106, such as a battery and/or any other storage device, coupled to a motor 108. In an exemplary embodiment, electric vehicle 102 also includes a vehicle controller 110 coupled to power storage device 106.

In an exemplary embodiment, charging device 104 is removably coupled to power storage device 106 and to vehicle controller 110 by at least one power conduit 112. Alternatively, charging device 104 may be coupled to power storage device 106 and/or vehicle controller 110 by any other conduit or conduits, and/or charging device 104 may be coupled to vehicle controller 110 by a wireless data link (not shown) and/or by inductive coupling such that no conduit 112 is used. In an exemplary embodiment, power conduit 112 includes at least one conductor (not shown) for supplying electricity to power storage device 106 and/or to any other component within electric vehicle 102, and at least one conductor (not shown) for transmitting data to, and receiving data from, vehicle controller 110 and/or any other component within electric vehicle 102. Alternatively, power conduit 112 may include a single conductor that transmits and/or receives power and/or data, or any other number of conductors that enables system 100 to function as described herein. In an exemplary embodiment, charging device 104 is coupled to an electric power source 114, such as a power grid of an electric utility company, a generator, a battery, and/or any other device or system that provides electricity to charging device 104.

In an exemplary embodiment, charging device 104 is coupled to at least one server 116 through a network, such as the Internet, a local area network (LAN), a wide area network (WAN), and/or any other network or data connection that enables charging device 104 to function as described herein. Server 116, in an exemplary embodiment, communicates with charging device 104 by transmitting a signal to charging device 104, for example, to authorize payment and/or delivery of electricity to power storage device 106, to access customer information, and/or to perform any other function that enables system 100 to function as described herein.

In an exemplary embodiment, server 116 and vehicle controller 110 each include at least one processor and at least one memory device. The processors each include any suitable programmable circuit which may include one or more systems and microcontrollers, microprocessors, reduced instruction set circuits (RISC), application specific integrated circuits (ASIC), programmable logic circuits (PLC), field programmable gate arrays (FPGA), and any other circuit capable of executing the functions described herein. The above examples are exemplary only, and thus are not intended to limit in any way the definition and/or meaning of the term "processor." The memory devices each include a computer readable medium, such as, without limitation, random access memory (RAM), flash memory, a hard disk drive, a solid state drive, a diskette, a flash drive, a compact disc, a digital video disc, and/or any suitable memory device that enables the processors to store, retrieve, and/or execute instructions and/or data.

During operation, in an exemplary embodiment, a user couples power storage device 106 to charging device 104 with power conduit 112. The user may access a user interface device (not shown in FIG. 1) of charging device 104 to enter information, such as payment information, and/or to initiate power delivery to power storage device 106. Charging device 104 is configured to communicate with server 116, for example, to authenticate the user, to process the payment information, and/or to approve or authorize the power delivery. If charging device 104 receives a signal from server 116 that indicates approval or authorization to deliver power to power storage device 106, charging device 104 receives power from electric power source 114 and provides the power to power storage device 106 through power conduit 112.

Charging device 104 communicates with vehicle controller 110 wirelessly, through power conduit 112, and/or through any other conduit, to control and/or to monitor the delivery of power to power storage device 106. For example, vehicle controller 110 transmits signals to charging device 104 indicating a charge level of power storage device 106 and/or a desired amount and/or rate of electricity, such as a maximum current level, to be provided by charging device 104. In addition, charging device 104 transmits signals to vehicle controller 110 indicating an amount and/or rate of electricity being delivered to power storage device 106. Additionally or alternatively, charging device 104 and/or vehicle controller 110 may transmit and/or receive any other signals or messages that enable system 100 to function as described herein. When power storage device 106 has been charged to a desired level, charging device 104 ceases delivering power to power storage device 106 and the user disengages power conduit 112 from power storage device 106.

Figure 2:
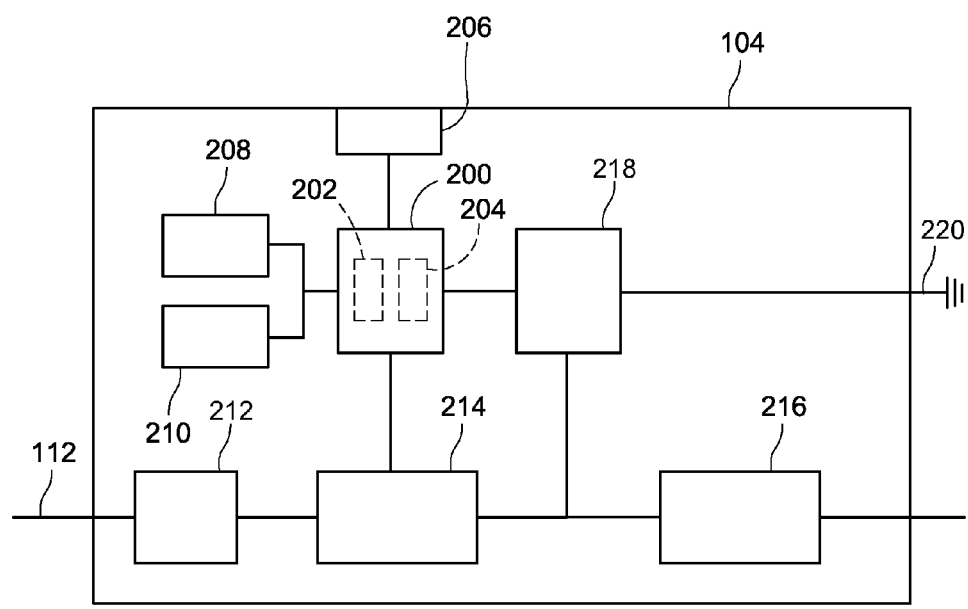
FIG. 2 is a block diagram of an exemplary charging device that may be used with the system shown in FIG. 1.

FIG. 2 is a block diagram of an exemplary charging device 104 that may be used with system 100 (shown in FIG. 1). In an exemplary embodiment, charging device 104 includes a controller 200 that includes a processor 202 and a memory device 204. As described more fully herein, controller 200 is coupled to a network interface 206, to a display 208, to a user interface device 210, to a meter 212, and to a current control device 214.

Processor 202 includes any suitable programmable circuit which may include one or more systems and microcontrollers, microprocessors, reduced instruction set circuits (RISC), application specific integrated circuits (ASIC), programmable logic circuits (PLC), field programmable gate arrays (FPGA), and any other circuit capable of executing the functions described herein. The above examples are exemplary only, and thus are not intended to limit in any way the definition and/or meaning of the term "processor." Memory device 204 includes a computer readable medium, such as, without limitation, random access memory (RAM), flash memory, a hard disk drive, a solid state drive, a diskette, a flash drive, a compact disc, a digital video disc, and/or any suitable device that enables processor 202 to store, retrieve, and/or execute instructions and/or data.

Network interface 206, in an exemplary embodiment, transmits and receives data between controller 200 and a remote device or system. In an exemplary embodiment, network interface 206 is communicatively coupled to at least one other charging device 104 such that charging devices 104 transmit and receive data to and from each other. In an exemplary embodiment, network interface 206 is coupled to a network interface 206 of at least one other charging device 104 using any suitable data conduit, such as an Ethernet cable, a Recommended Standard (RS) 485 compliant cable, and/or any other data conduit that enables charging device 104 to function as described herein. Alternatively, network interface 206 communicates wirelessly with a network interface 206 of at least one other charging device 104 using any suitable wireless protocol.

In an exemplary embodiment, display 208 includes a vacuum fluorescent display (VFD) and/or one or more light-emitting diodes (LED). Additionally or alternatively, display 208 may include, without limitation, a liquid crystal display (LCD), a cathode ray tube (CRT), a plasma display, and/or any suitable visual output device capable of displaying graphical data and/or text to a user. In an exemplary embodiment, a charging status of power storage device 106 (shown in FIG. 1), payment information, user authentication information, and/or any other information may be displayed to a user on display 208.

User interface device 210 includes, without limitation, a keyboard, a keypad, a touch-sensitive screen, a scroll wheel, a pointing device, a barcode reader, a magnetic card reader, a radio frequency identification (RFID) card reader, a contactless credit card reader, a near field communication (NFC) device reader, an audio input device employing speech-recognition software, and/or any suitable device that enables a user to input data into charging device 104 and/or to retrieve data from charging device 104. In an exemplary embodiment, the user may operate user interface device 210 to initiate and/or terminate the delivery of power to power storage device 106. In one embodiment, the user may input user authentication information and/or payment information using user interface device 210.

Meter 212 is coupled to power conduit 112 and to current control device 214 for use in measuring and/or calculating the current, voltage, and/or power provided from electric power source 114 to power storage device 106. Meter 212 transmits data representative of the measured current, voltage, and/or power to controller 200.

In an exemplary embodiment, current control device 214 is coupled to power conduit 112 and to meter 212. In an exemplary embodiment, current control device 214 is a contactor 214 coupled to, and controlled by, controller 200. In an exemplary embodiment, controller 200 operates, or opens contactor 214 to interrupt the current flowing through power conduit 112 such that power storage device 106 is electrically disconnected from electric power source 114 (shown in FIG. 1). Controller 200 closes contactor 214 to enable current to flow through power conduit 112 such that power storage device 106 is electrically connected to electric power source 114.

In an exemplary embodiment, a current protection device 216 is coupled to contactor 214 and to electric power source 114. Current protection device 216 electrically isolates or disconnects charging device 104 from electric power source 114 if the current received from electric power source 114 exceeds a predetermined threshold or current limit. In an exemplary embodiment, current protection device 216 is a circuit breaker. Alternatively, current protection device 216 may be a fuse, a relay, and/or any other device that enables current protection device 216 to function as described herein.

In addition, charging device 104 includes a ground detection module 218 coupled to controller 200. In an exemplary embodiment, ground detection module 218 detects whether charging device 104 is electrically coupled to ground 220. As used herein, the term "ground" includes a conductor that provides a return path for electrical current and/or that dissipates undesired current. Ground 220 may be a physical portion of the earth, a conductor coupled to the physical portion of the earth, and/or a conductor that is coupled to one or more electrical components to create a return path for the components. Ground detection module 218 enables or disables the current to be supplied to power storage device 106 based on the detected ground connection, for example, by transmitting a signal to controller 200. The signal causes controller 200 to open or close contactor 214 to enable current to be supplied to power storage device 106 or to disable current from being supplied to power storage device 106.

During operation, power storage device 106 of electric vehicle 102 is coupled to charging device 104 using power conduit 112. In one embodiment, a user obtains authorization from server 116 and/or another system or device to enable charging device 104 to charge (i.e., to provide electrical current to) power storage device 106. Charging device 104 determines an amount and/or rate of current to provide to power storage device 106 and supplies the determined amount and/or rate of current to power storage device 106. If ground detection module 218 detects that a connection to ground 220 has been interrupted and/or that charging device 104 is not electrically coupled to ground 220 (hereinafter referred to as a "ground interruption" or a "ground interruption event"), power storage device 106 is electrically disconnected from electric power source 114 (e.g., by opening contactor 214), thus interrupting the supply of current to power storage device 106.

Figure 3:
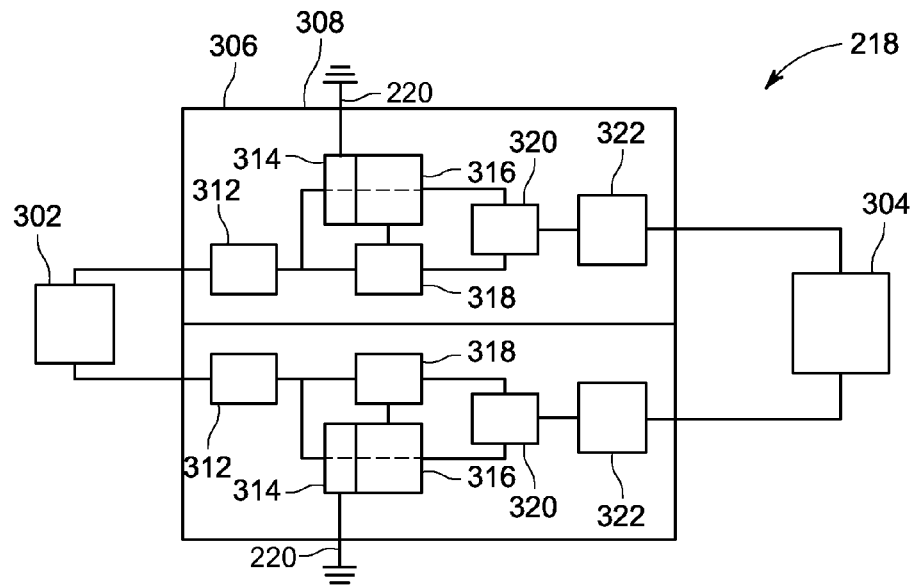
FIG. 3 is a block diagram of an exemplary ground detection module that may be used with the charging device shown in FIG. 2.

FIG. 3 is a schematic block diagram of an exemplary ground detection module 218 that may be used with charging device 104 (shown in FIG. 1). In an exemplary embodiment, ground detection module 218 includes an input connector 302 and an output connector 304. Input connector 302 is coupled to electric power source 114 (shown in FIG. 1). Output connector 304 is coupled to controller 200 (shown in FIG. 2), and controller 200 controls or operates contactor 214 based on signals received from output connector 304 to supply current to power conduit 112 (shown in FIG. 1).

Ground detection module 218 includes one or more ground detection circuits 306, such as a first ground detection circuit 308 and a second ground detection circuit 310. First ground detection circuit 308 and second ground detection circuit 310 are coupled to input connector 302 and receive a first phase and a second phase of alternating current (AC) from connector 302. Alternatively, first and second ground detection circuits 308 and 310 receive only a first phase of current. In an alternative embodiment, any number of ground detection circuits 306 are provided to receive any number of phases of AC from input connector 302.

In an exemplary embodiment, each ground detection circuit 306 includes a rectification circuit 312, a leakage circuit 314, a conditioning circuit 316, a reference circuit 318, a comparison circuit 320, and a switching circuit 322.

Rectification circuit 312 is coupled to input connector 302 and receives AC power (i.e., voltage and current) from connector 302. Rectification circuit 312 converts, or rectifies, the current received from input connector 302 to direct current (DC). In an exemplary embodiment, rectification circuit 312 includes at least one diode. Alternatively, rectification circuit 312 may include any other rectification device or component that enables circuit 312 to function as described herein. The DC current is transmitted to leakage circuit 314, to conditioning circuit 316, and to reference circuit 318.

Leakage circuit 314, in an exemplary embodiment, is coupled to rectification circuit 312 and conditioning circuit 316. Leakage circuit 314 receives a portion of the DC current (hereinafter referred to as the "leakage current") transmitted by rectification circuit 312, and the leakage current is transmitted or directed to ground 220 for detecting the electrical connection between charging device 104 and ground 220. More specifically, the leakage current creates a voltage drop across leakage circuit 314 (hereinafter referred to as the "leakage voltage") and the voltage drop is used to detect the electrical connection between charging device 104 and ground 220. In an exemplary embodiment, leakage circuit 314 includes at least one resistor coupled between an output of rectification circuit 312 and ground 220. Alternatively, leakage circuit 314 may include any other device or component that enables circuit 314 to function as described herein.

Conditioning circuit 316 is coupled in parallel with leakage circuit 314, and is coupled to reference circuit 318 and to comparison circuit 320. Conditioning circuit 316 receives DC current from rectification circuit 312 and conditions or adjusts the DC current. More specifically, conditioning circuit 316 "smoothes," or reduces undesired current ripples that may be present in the DC current, for example, as a result of the rectification of the DC current by rectification circuit 312. In one embodiment, a voltage across conditioning circuit 316 is equal to the leakage voltage, and the leakage voltage and/or the voltage across conditioning circuit 316 is conditioned and provided to comparison circuit 320. In an exemplary embodiment, conditioning circuit 316 includes at least one capacitor and at least one Zener diode that are coupled in parallel with each other, and that are each coupled between an output of rectification circuit 312 and ground 220. The Zener diode is reverse biased by the output of rectification circuit 312 such that a breakdown voltage is created to protect comparison circuit 320.

Reference circuit 318 is coupled to rectification circuit 312, to conditioning circuit 316, and to comparison circuit 320. Reference circuit 318 provides a reference voltage to comparison circuit 320 for detecting the electrical connection between charging device 104 and ground 220.

In an exemplary embodiment, comparison circuit 320 is coupled to reference circuit 318, conditioning circuit 316, leakage circuit 314, and rectification circuit 312. Comparison circuit 320 compares the leakage voltage, as conditioned by conditioning circuit 316, and the reference voltage provided by reference circuit 318 to facilitate detecting whether the connection to ground 220 is properly provided. Comparison circuit 320 outputs a comparison signal to switching circuit 322 representing the result of the comparison. In an exemplary embodiment, the comparison signal outputs a first, or low (e.g., a logical low) voltage comparison signal if the connection to ground 220 is detected, and outputs a second, or high (e.g., a logical high) voltage comparison signal if the connection to ground 220 is not detected. Comparison circuit 320, in an exemplary embodiment, includes at least one comparator, such as an operational amplifier comparator. A positive, or non-inverting, terminal of the comparator is coupled to reference circuit 318 and a negative, or inverting, terminal is coupled to conditioning circuit 316. If the leakage voltage, as conditioned by conditioning circuit 316, is greater than the reference voltage, the comparator will output a comparison signal having a low voltage or a zero voltage. However, if the leakage voltage is less than the reference voltage, the comparator will output a comparison signal having a high voltage that is substantially equal to a supply voltage provided to the comparator. In an alternative embodiment, comparison circuit 320 may include any other comparator or component to enable circuit 320 to function as described herein.

Switching circuit 322 is coupled to comparison circuit 320 and to output connector 304. Switching circuit 322 receives the comparison signal from comparison circuit 320 and provides a control signal to output connector 304 to enable current to be provided to power conduit 112 and/or to power storage device 106 and/or disable current from being provided to conduit 112 and/or device 106 based on the comparison signal. More specifically, switching circuit 322 transmits the control signal to controller 200 through output connector 304 such that controller 200 enables current to be provided (through contactor 214) to power conduit 112 and/or to power storage device 106 if the comparison signal indicates that the connection to ground 220 is detected. Switching circuit 322 transmits the control signal to controller 200 through output connector 304 such that controller 200 disables current from being provided (through contactor 214) to conduit 112 and/or device 106 if the comparison signal indicates that the connection to ground 220 is not detected. Alternatively, switching circuit 322 transmits the control signal directly (rather than indirectly through controller 200) to one or more contactors (e.g., contactor 214) to enable or disable the supply of current to power conduit 112. In an exemplary embodiment, switching circuit 322 includes at least one transistor, such as a metal oxide semiconductor field effect transistor (MOSFET). Alternatively, switching circuit 322 may include any other switch or component that enables circuit 322 to function as described herein.

In an exemplary embodiment, if a plurality of switching circuits 322 and/or ground detection circuits 306 are included, each switching circuit 322 of each ground detection circuit 306 within ground detection module 218 must provide the control signal to enable current to be provided to power conduit 112 and/or to power storage device 106 (shown in FIG. 1). Accordingly, if any ground detection circuit 306 and/or comparison circuit 320 detects a ground interruption, switching circuit 322 of that ground detection circuit 306 disables the control signal and output connector 304 does not enable current to be provided to power conduit 112 and/or to power storage device 106. In this respect, the redundant use of ground detection circuits increases a reliability of ground detection module 218 and increases a safety of charging device 104.

Figure 4:
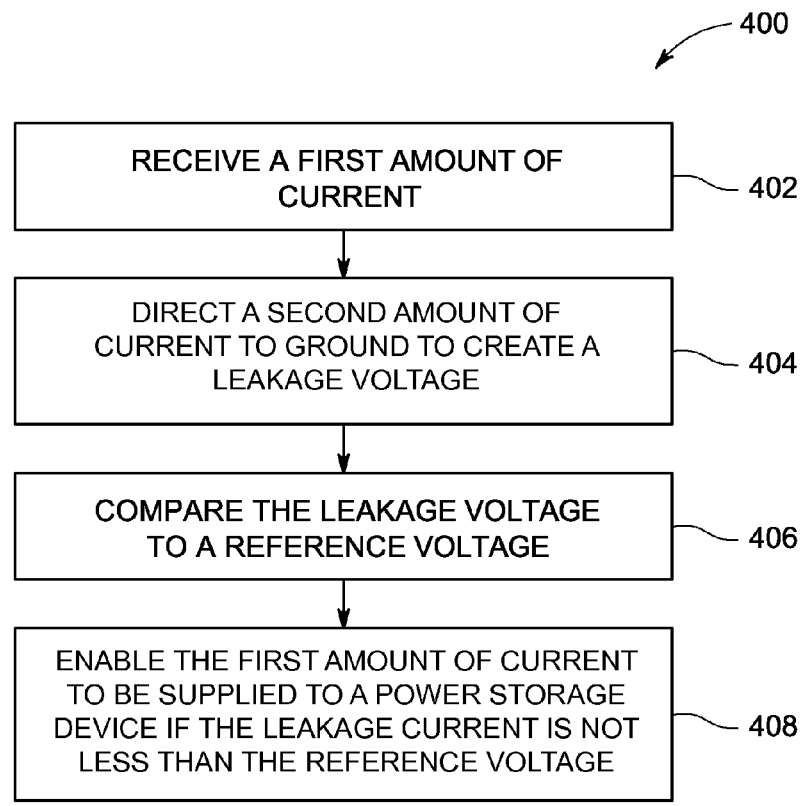
FIG. 4 is a flow diagram of an exemplary method of detecting a grounding state of a charging device that may be used with the charging device shown in FIG. 2.

FIG. 4 is a flow diagram of an exemplary method 400 of detecting a grounding state of a charging device, such as charging device 104 (shown in FIG. 1). In an exemplary embodiment, method 400 is at least partially implemented by ground detection module 218 (shown in FIG. 2).

In an exemplary embodiment, a first amount of current is received 402 by charging device 104 from, for example, electric power source 114 (shown in FIG. 1) or another suitable electrical source. In an embodiment, the first amount of current is an amount of current requested to be supplied to power storage device 106 (shown in FIG. 1) for use in charging device 106. A second amount of current (e.g., the leakage current) is directed 404 to ground 220 (shown in FIG. 2) to create a leakage voltage. More specifically, the leakage current is directed through leakage circuit 314 (shown in FIG. 3) to create the leakage voltage.

The leakage voltage is compared 406 to a reference voltage to detect or determine the grounding state of charging device 104. More specifically, comparison circuit 320 compares 406 the leakage voltage provided by leakage circuit 314 with the reference voltage provided by reference circuit 318. If the leakage voltage is not less than the reference voltage (i.e., if the leakage voltage is equal to, or greater than, the reference voltage), the grounding state of charging device 104 is determined to be properly grounded. However, if the leakage voltage is less than the reference voltage, the grounding state of charging device 104 is determined to be improperly grounded. As used herein, the term "grounding state" refers to a state of the connection to ground 220 of charging device 104, such as whether the connection to ground 220 is properly provided.

If charging device 104 is determined to be properly grounded, the first amount of current is enabled 408 to be supplied to a power storage device, such as power storage device 106, through contactor 214 that is operated by controller 200 (both shown in FIG. 2). More specifically, if the leakage current is not less than the reference voltage, output connector 304 transmits a control signal to controller 200 to enable 408 the first amount of current to be supplied to power storage device 106. In one embodiment, the first amount of current is an amount of current requested by electric vehicle 102 (e.g., by vehicle controller 110) (shown in FIG. 1). In another embodiment, the first amount of current is an amount of current available to be supplied to power storage device 106. Alternatively, the first amount of current is any other suitable amount that enables method 400 to function as described herein.

As described herein, a charging device includes a robust and effective ground detection module for detecting a connection of the charging device to ground. The ground detection module includes one or more ground detection circuits. Each ground detection circuit included detects a connection to ground by directing at least a portion of current received by each circuit to ground to create a leakage voltage. The leakage voltage is compared to a reference voltage to determine if the connection to ground is properly provided. If the leakage voltage is greater than, or is equal to, the reference voltage, the ground detection circuit detects and/or determines that the connection to ground is properly provided. However, if the leakage voltage is less than the reference voltage, the ground detection circuit detects that the connection to ground has been interrupted and/or has not been properly provided.

A technical effect of the systems, devices, and methods described herein includes at least one of (a) receiving a first amount of current from a power source; (b) directing a second amount of current to ground to generate a leakage voltage; (c) receiving a reference voltage; (d) comparing a leakage voltage to a reference voltage; and (e) detecting a connection to ground based on a comparison of a leakage voltage and a reference voltage.

Exemplary embodiments of a charging device and a method of detecting a connection to ground are described above in detail. The charging device and method are not limited to the specific embodiments described herein, but rather, components of the charging device and/or steps of the method may be utilized independently and separately from other components and/or steps described herein. For example, the method may also be used in combination with other power systems and devices, and is not limited to practice with only the charging device as described herein. Rather, the exemplary embodiment can be implemented and utilized in connection with many other power system applications.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A charging device comprising:
   a current control device configured to receive a first amount of current from a power source;
   a ground detection module comprising:
      a rectification circuit configured to convert alternating current to direct current and generate a direct current (DC) voltage;
      a leakage circuit coupled to an output of said rectification circuit, said leakage circuit configured to direct a second amount of current to a ground to generate a DC leakage voltage based on the DC voltage generated by said rectification circuit;
      a conditioning circuit coupled between the output of said rectification circuit and the ground such that said conditioning circuit is coupled in parallel with said leakage circuit, said conditioning circuit configured to adjust direct current received from said rectification circuit;
      a reference circuit coupled to the output of said rectification circuit and configured to provide a reference voltage based on the DC voltage generated by said rectification circuit; and
      a comparison circuit coupled to said rectification circuit and said reference circuit and configured to detect a connection to the ground of said charging device by comparing the reference voltage to the DC leakage voltage; and
   a controller coupled to said ground detection module and to said current control device, said controller configured to enable the first amount of current to be supplied to a power storage device of an electric vehicle when the connection to the ground is detected.

2. A charging device in accordance with claim 1, wherein said comparison circuit is configured to detect the connection to the ground when the DC leakage voltage is not less than the reference voltage.

3. A charging device in accordance with claim 1, further comprising a switching circuit configured to transmit a control signal to said controller to one of disable and enable the first amount of current to be supplied to the power storage device based on a status of the connection to the ground.

4. A charging device in accordance with claim 3, wherein said controller operates said current control device to one of disable and enable the first amount of current to be supplied to the power storage device.

5. A charging device in accordance with claim 1, wherein said comparison circuit is a first comparison circuit, said ground detection module comprises a second comparison circuit, wherein said controller is configured to enable the first amount of current to be supplied to the power storage device when each of said first comparison circuit and said second comparison circuit detects a connection to the ground.

6. A ground detection module for use with a charging device, said ground detection module comprising:
   a ground detection circuit comprising:
      a rectification circuit configured to convert alternating current to direct current and generate a direct current (DC) voltage;
      a leakage circuit coupled to an output of said rectification circuit, said leakage circuit configured to direct a first amount of current to a ground to generate a DC leakage voltage based on the DC voltage generated by said rectification circuit;
      a conditioning circuit coupled between the output of said rectification circuit and the ground such that said conditioning circuit is coupled in parallel with said leakage circuit, said conditioning circuit configured to adjust direct current received from said rectification circuit;
      a reference circuit coupled to the output of said rectification circuit and configured to provide a reference voltage based on the DC voltage generated by said rectification circuit; and
      a comparison circuit coupled to said rectification circuit and said reference circuit and configured to detect a connection to the ground of the charging device by comparing the reference voltage to the DC leakage voltage; and
   an output connector configured to enable a second amount of current to be supplied to a power storage device when the connection to the ground is detected.

7. A ground detection module in accordance with claim 6, wherein said comparison circuit is configured to detect the connection to ground if the DC leakage voltage is not less than the reference voltage.

8. A ground detection module in accordance with claim 6, further comprising a switching circuit configured to one of disable and enable the second amount of current to be supplied to the power storage device based on a status of the connection to the ground.

9. A ground detection module in accordance with claim 8, wherein said switching circuit transmits a signal to said output connector to one of disable and enable the second amount of current to be supplied to the power storage device.

10. A ground detection module in accordance with claim 6, wherein said ground detection circuit is a first ground detection circuit comprising a first comparison circuit, said ground detection module comprises a second ground detection circuit comprising a second comparison circuit, wherein said output connector is configured to enable the second amount of current to be supplied to the power storage device when each of said first comparison circuit and said second comparison circuit detects a connection to the ground.

11. A method of detecting a grounding state of a charging device, said method comprising:
   receiving alternating current from a power source;
   converting a first amount of the alternating current to direct current using a rectification circuit to generate a direct current (DC) voltage;
   transmitting the direct current to a ground to generate a DC leakage voltage using a leakage circuit coupled to an output of the rectification circuit, the DC leakage voltage based on the DC voltage generated by the rectification circuit;

adjusting direct current received from the rectification circuit with a conditioning circuit coupled between the output of the rectification circuit and the ground such that the conditioning circuit is coupled in parallel with the leakage circuit;

receiving a reference voltage from a reference circuit coupled to the output of the rectification circuit, the reference voltage based on the DC voltage generated by the rectification circuit;

comparing the DC leakage voltage to the reference voltage; and detecting a connection to the ground based on the comparison of the DC leakage voltage and the reference voltage.

12. A method in accordance with claim 11, wherein said detecting a connection to the ground comprises detecting a connection to the ground if the DC leakage voltage is not less than the reference voltage.

13. A method in accordance with claim 11, further comprising enabling a second amount of the alternating current received from the power source to be supplied to a power storage device when the connection to the ground is detected.

14. A method in accordance with claim 13, further comprising preventing the second amount of current from being supplied to the power storage device when the connection to the ground is not detected.

15. A method in accordance with claim 11, wherein the charging device includes a first detection circuit and a second detection circuit, said detecting a connection to the ground comprises detecting a connection to the ground by each of the first detection circuit and the second detection circuit.

16. A method in accordance with claim 15, wherein a second amount of current is enabled to be supplied to a power storage device when each of the first detection circuit and the second detection circuit detect a connection to the ground.

* * * * *